United States Patent [19]

Tabata

[11] Patent Number: 5,037,134
[45] Date of Patent: Aug. 6, 1991

[54] ACTUATOR FOR TIGHTENING A SEAT BELT

[75] Inventor: Hiroshi Tabata, Saitama, Japan

[73] Assignee: Honda Giken Kogyo Kabushiki Kaisha, Tokyo, Japan

[21] Appl. No.: 413,662

[22] Filed: Sep. 28, 1989

[30] Foreign Application Priority Data

Sep. 29, 1988 [JP] Japan .............................. 63-127639[U]

[51] Int. Cl.$^5$ .............................................. B60R 22/46
[52] U.S. Cl. ...................................... 280/806; 280/807
[58] Field of Search ............... 280/802, 806, 807, 808, 280/801; 92/248, 250, 256; 242/107, 107.4 R, 107.4 A

[56] References Cited

U.S. PATENT DOCUMENTS

| 2,445,057 | 7/1948 | Driscoll | 92/250 |
|---|---|---|---|
| 2,512,098 | 6/1950 | Gratzmuller | 92/250 |
| 2,883,123 | 4/1959 | Finnigan | 280/806 |
| 3,354,794 | 11/1967 | Dailey | 92/250 |
| 4,143,586 | 3/1979 | Zitting | 92/250 |
| 4,309,937 | 1/1982 | Schardt | 92/248 |
| 4,423,846 | 1/1984 | Fohl | 280/806 |
| 4,508,287 | 4/1985 | Nilsson | 280/806 |
| 4,539,895 | 9/1985 | Tanaka et al. | 92/250 |
| 4,573,322 | 3/1986 | Fohl | 280/806 |
| 4,789,185 | 12/1988 | Fohl | 280/806 |
| 4,840,325 | 6/1989 | Higuchi | 242/107.2 |
| 4,864,086 | 9/1989 | Akiyama | 200/61.53 |
| 4,889,068 | 12/1989 | Tabata et al. | 280/806 |
| 4,955,638 | 9/1990 | Kinoshita et al. | 280/806 |

FOREIGN PATENT DOCUMENTS

| 63-212151 | 9/1988 | Japan | 280/806 |
|---|---|---|---|
| 240345 | 9/1989 | Japan | 280/806 |
| 317851 | 12/1989 | Japan | 280/806 |
| 2223666 | 4/1990 | United Kingdom | 280/806 |

Primary Examiner—Charles A. Marmor
Assistant Examiner—Tamara L. Finlay
Attorney, Agent, or Firm—Armstrong, Nikaido, Marmelstein, Kubovcik & Murray

[57] ABSTRACT

An actuator for a seat belt tightening device for a vehicle using a piston received in a cylinder so as to be actuated by an explosive expansion of a propellant in a chamber defined in the cylinder behind the piston. To ensure a required strength of the coupling between the piston and a cable for transmitting the actuating force and to simplify the process of attaching the cable to the piston, the piston is cast by metal or alloy with an end of the cable embedded therein. Thus, the piston may be used as cast and no extra work is required to tie the cable to the piston. To improve the sealing capability of the piston, a skirt having a flared edge made of synthetic resin may be attached to the rear end of the piston.

9 Claims, 3 Drawing Sheets

ACTUATOR FOR TIGHTENING A SEAT BELT

TECHNICAL FIELD

The present invention relates to an actuator for a seat belt tightening device for automatically taking up slack from the seat belt in case of a vehicle crash, and in particular to a piston structure for use in a drive device for applying a tension to the seat belt.

BACKGROUND OF THE INVENTION

A vehicle seat is provided with a seat belt device for restraining the vehicle occupant to prevent the vehicle occupant from being thrown forward or sideways in case of a vehicle crash. Since such a seat belt device is desired not to obstruct the normal movement of the occupant and to be tightened only when a deceleration in excess of a prescribed value has been applied to the vehicle, there have been proposed a number of seat belt tightening devices which detect an impact of a vehicle crash through a displacement of an elastically supported pendulum caused by an inertia force acting thereon, ignite a propellant which can rapidly expand by a chemical reaction by the action of a trigger engaged by the pendulum, and wind the seat belt by way of a cable which is connected to a piston received in a cylinder so that the thrust due to the rapid expansion of the propellant may be applied to the piston. For more detailed discussion of this technology, reference is made to co-pending U.S. patent applications Ser. No. 07/030,630 (filed Mar. 27, 1987), now U.S. Pat. No. 4,840,325, dated June 20, 1989; Ser. No. 07/132,257 (filed Dec. 14, 1987), now U.S. Pat. No. 4,864,086, dated Sept. 5, 1989; and Ser. No. 07/250,782 (filed Sept. 28, 1988; now U.S. Pat. No. 4,955,638, dated Sept. 11, 1990, assigned to the assignee of the present application.

Since such a device is used in a highly unusual situation such as in case of a vehicle crash, and it is virtually impossible to test its capability to operate under normal condition, an extremely high operation reliability is required. Thus, the strength of the coupling between the piston which receives the expansion pressure of the propellant and the cable connected therewith is highly important. Normally, the cable and the piston are connected to each other by passing an end of the cable into a hole extending through the piston and crimping the end of the piston opposite to the pressure receiving end. Therefore, the length of the piston must be increased to accommodate this crimped part, and it is difficult to ensure a sufficient and stable strength of coupling between the cable and the piston.

Further, the fit between the cylinder and the piston is important in efficiently applying the expansion pressure of the propellant to the piston and ensuring a smooth sliding movement of the piston in the cylinder at the same time. To achieve a precise fit, manufacturing precision must be increased but it leads to the increase in manufacturing cost and causes an added complexity to quality control.

BRIEF SUMMARY OF THE INVENTION

In view of such problems of the prior art, a primary object of the present invention is to provide a piston and cylinder structure in an actuator for a seat belt tightening device for a vehicle which ensures a stable and high mechanical strength in the coupling between the piston and the cable and simplifies the manufacturing process at the same time.

A second object of the present invention is to provide an actuator for a seat belt tightening device for a vehicle which can improve air-tightness of the fitting between the piston and the cylinder without complicating the manufacturing process.

According to the present invention, these and other objects can be accomplished by providing an actuator for tightening a seat belt for a vehicle, comprising: a piston made of cast metal or alloy and received in a cylinder having a substantially closed base end; a deceleration sensor for detecting a deceleration level indicative of a vehicle crash; a propellant received in a case communicated with a chamber defined between a rear end surface of the piston and the base end of the cylinder and provided with means for ignition thereof upon detection of the deceleration level by the deceleration sensor; cable means such as a wire cable connected with the piston at its one end and seat belt pulling means for clamping a part of a seat belt and pulling it at its other end; the one end of the cable means being cast in the piston.

This ensures a required strength of the coupling between the piston and the cable for transmitting the actuating force and simplifies the process of attaching the cable to the piston.

Preferably, an annular skirt member, for instance made of synthetic resin, having a flared circular edge may be coaxially attached to a rear end of the piston so as to seal off the chamber defined behind the piston by the edge cooperating with an inner circumferential surface of the cylinder for added sealing effect. By doing so, a sufficient sealing effect may be produced even when the piston is used as cast without any machining or other processing.

Alternatively, the piston may be substantially entirely encased in a cover made of synthetic resin for a desired sealing effect. The cover may be integrally provided with an annular skirt member of the aforementioned kind.

BRIEF DESCRIPTION OF THE DRAWINGS

Now the present invention is described in the following in terms of specific embodiments with reference to the appended drawings, in which.

DESCRIPTION OF THE PREFERRED EMBODIMENTS

Figure 1:
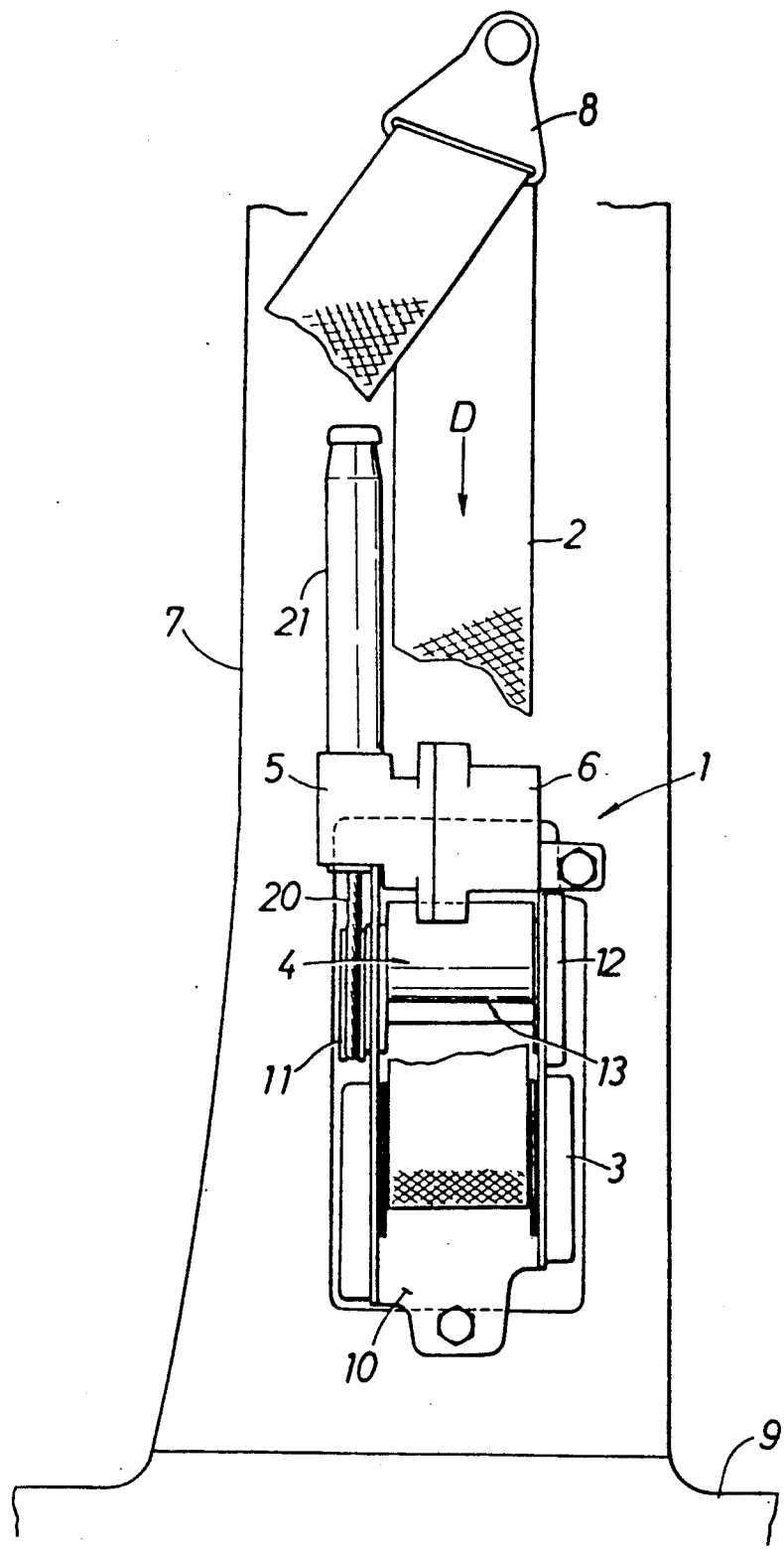
FIG. 1 is a side view of a structure for mounting a actuator for a seat belt tightening device upon a center pillar of the vehicle body as seen from the interior of the passenger compartment.

FIG. 1 schematically illustrates a seat belt tightening device according to the present invention. The actuator for the seat belt tightening device 1 is provided with a conventional emergency locking retractor device (abbreviated as ELR device hereinafter) 3 for retracting a seat belt 2 in case of an emergency, a pulling device 4 for tightening the seat belt 2 only in the case of a vehicle crash or the like, a power generating device 5 for rotatively driving the pulling device 4, and a deceleration sensor 6 for detecting an impact acting upon the vehicle body in case of a vehicle crash, and is secured to a lower part of a center pillar 7.

The seat belt 2 which has been pulled out upwards from the ELR device 3 is passed through the pulling device 4 and then through a through ring 8 secured to an upper part of the center pillar 7, from which the seat belt 2 is passed downwards and is fixedly secured to a rear side part of a seat not shown in the drawing or a part of a side sill at its free end. The seat belt 2 itself is not different from conventional seat belts, and is not described in any further detail.

The pulling device 4 comprises a pulley 11 rotatably mounted on a side wall of a frame 10 integrally formed with the casing of the ELR device 3 by bending a metal plate, a ratchet mechanism 12 of a known type consisting of a ratchet wheel and a ratchet pawl provided on the other side wall, and a clamp mechanism 13 extending between the opposing surfaces of the pulley 11 and the ratchet mechanism 12, and is adapted to clamp and retract the part of the seat belt 2 paid out from the ELR device 3. Passed around the pulley 11 is a cable 20 which is connected to the power generating device 5 at its one end to a part of the pulley 11 at its other end.

Figure 2:
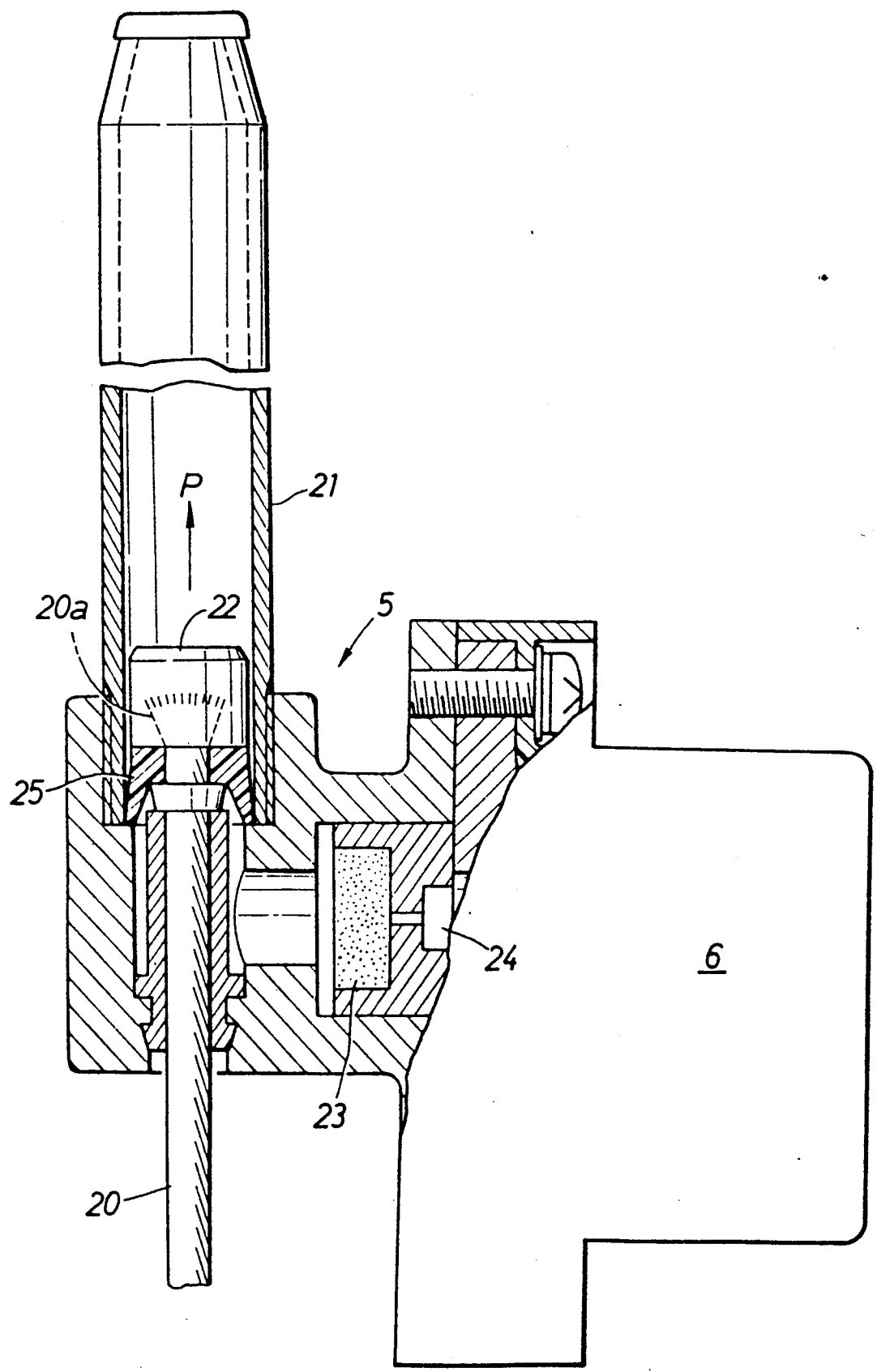
FIG. 2 is an enlarged sectional view of an essential part thereof.

The power generating device 5 comprises, as shown in FIG. 2, a cylinder 21 extending along a tangential direction of the pulley 11, a piston 22 integrally cast with an end 20a of the cable 20 embedded therein and slidably received in the cylinder 21, a propellant cartridge 23 received in a base portion of the cylinder 21 to apply a thrust to the piston 22, and a fuse 24 for igniting the propellant cartridge 23, and is secured to an upper end of the frame 10. The propellant cartridge 23 is ignited by the action of the deceleration sensor 6 which is fixedly secured to a base end of the cylinder 21 so that the cable 20 may be pulled by the piston 22 sliding in the cylinder 21 by the action of the combustion pressure of the propellant cartridge 23, and the pulling device 4 may be rotatively driven thereby by way of the pulley 11. The base end of the piston 22 or its end portion which is subjected to the combustion pressure of the propellant cartridge 23 is provided with an annular skirt 25 made of heat resistant resin material.

The deceleration sensor 6 used in the present system may consist of such a device which activates a trigger by displacement of a pendulum under the action of an inertia force, and strikes a firing pin against a fuse 24.

When the fuse 24 is ignited upon detection of a large deceleration due to a vehicle crash, the resulting combustion pressure pushes the piston 22. When the piston 22 is activated, the cable 20 is pulled in the direction indicated by the arrow P in FIG. 2, and the pulley 11 is turned. As result, the clamp mechanism 13 clamps the seat belt 2, and retracts it in the direction indicated by the arrow D in FIG. 1. When the stroke of the piston 22 has reached its limit, the ratchet mechanism 12 prevents the reverse rotation of the pulling device 4.

In the above described device, it is desired to increase the strength of the coupling between the cable 20 and the piston 22 which receives the expansion pressure produced by the combustion of the propellant cartridge 23 to rotatively drive the pulley 11 as much as possible, and to obtain a uniform manufacturing quality. To achieve a higher coupling strength than the conventional method based on crimping can achieve, according to the present invention, an end 20a of the cable 20 is cast in the piston 22.

To apply the expansion pressure of the propellant cartridge 23 to the piston 22 and permit the piston 22 to slide smoothly in the cylinder 21, the precision of the fitting between the cylinder 21 and the piston 22 is required to be high. If an attempt is made to increase the fitting precision between the cylinder 21 and the piston 22, it will increase the complexity of the manufacturing process. Therefore, according to the present invention, a skirt 25 made of synthetic resin and having a circular flared sealing edge is coaxially provided on the pressure receiving surface of the piston 22. According to this structure, the skirt 25 made of resin material expands and closely contacts the inner circumferential surface of the cylinder 21 at its circular edge upon receiving of pressure. This not only improves the sealing effect therebetween but also offers the benefit of the self-lubricating property of the resin material so as to permit the piston 22 to slide smoothly in the cylinder 21.

Figure 3:
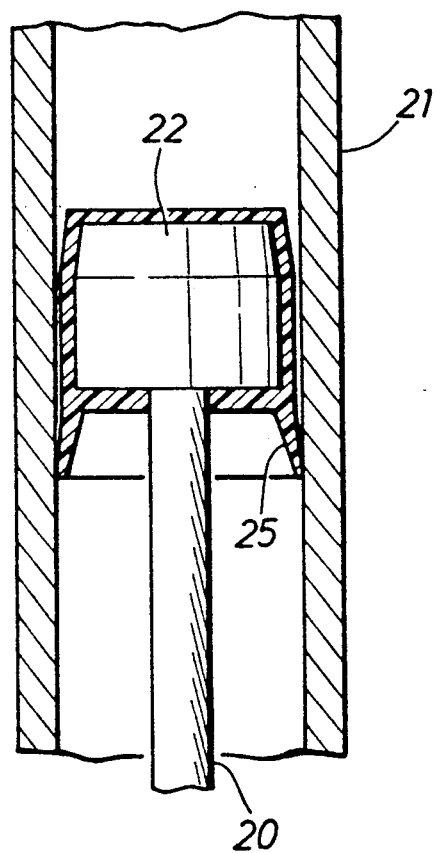
FIG. 3 is a fragmentary sectional view of a modified embodiment of the present invention.

It is also possible to cover the entire piston 22 with a cover made of synthetic resin material as illustrated in FIG. 3. This cover may be provided with an integral extension which is shaped identically to the skirt 25 of the previous embodiment.

Thus, according to the present invention, the strength of the coupling between the piston and the cable can be increased, and the length of the piston can be reduced because no crimping is required. Since most of the pressure is received by the piston and pressure leakage is prevented by the skirt closing the gap between the cylinder and the piston, the manufacturing precision of the piston and the cylinder may not be very high in order to ensure the necessary air-tightness. In short, the present invention offers a significant advantage in improving the operation reliability of the device and reducing the manufacturing cost.

What I claim is:

1. An actuator for connection to a seat belt pulling means for clamping a part of a seat belt and retracting said clamped seat belt for tightening the seat belt for a vehicle, comprising:
   a frame;
   a cast metal piston receiving a cylinder mounted on said frame, said cylinder having a substantially closed base end;
   a deceleration sensor mounted on said frame for detecting a deceleration level indicative of a vehicle crash;
   a propellant received in a case on said frame and communicating with a chamber on said frame defined between a rear end surface of said piston and said base end of said cylinder and provided with means for ignition thereof upon detection of said deceleration sensor; and
   cable means connected at one of its ends with said piston and at its other end with said seat belt pulling means for clamping and retracting;
   said one end of said cable means being cast in said piston.

2. An actuator for tightening a seat belt according to claim 1, wherein said cable means consists of a wire rope.

3. An actuator for tightening a seat belt according to claim 1, wherein an annular skirt member having a flared circular edge is coaxially attached to a rear end of said piston so as to seal off said chamber defined behind said piston by said edge cooperating with an inner circumferential surface of said cylinder.

4. An actuator for tightening a seat belt according to claim 3, wherein said annular skirt member is made of synthetic resin.

5. An actuator for tightening a seat belt according to claim 1, wherein said piston is substantially entirely encased in a cover made of synthetic resin.

6. An actuator for tightening a seat belt according to claim 5, wherein said cover is integrally provided with an annular skirt member having a flared circular edge extending coaxially from a rear end of said piston so as to seal off said chamber defined behind said piston by said edge cooperating with an inner circumferential surface of said cylinder.

7. An actuator for connection to a seat belt pulling means for clamping a part of a seat belt and retracting said clamped seat belt for tightening the seat belt for a vehicle, comprising:
- a frame;
- a cast metal piston received in a cylinder mounted on said frame, said cylinder having a substantially closed base end;
- a deceleration sensor mounted on said frame for detecting a deceleration level indicative of a vehicle crash;
- a propellant received in a case on said frame and communicating with a chamber on said frame defined between a rear end surface of said piston and said base end of said cylinder and provided with means for ignition thereof upon detection of said deceleration level by said deceleration sensor;
- cable means connected at one of its ends with said piston and at its other end with said seat belt pulling means for clamping retracting said clamped seat belt, said one end of said cable means being cast in said piston; and
- an annular synthetic resin skirt member having flared circular edges and coaxially attached to a rear end of said piston so as to seal off said chamber defined behind said piston by the edge cooperating with an inner circumferential surface of said cylinder.

8. An actuator for tightening a seat belt according to claim 7, wherein said skirt member is an extension of a cover substantially entirely encasing said piston.

9. An actuator for connection to a seat belt pulling means for clamping a part of a seat belt and retracting said clamped seat belt for tightening the seat belt for a vehicle, comprising:
- a frame;
- a cast metal piston received in a cylinder mounted on said frame, said cylinder having a substantially closed base end;
- a deceleration sensor mounted on said frame for detecting a deceleration level indicative of a vehicle crash;
- a propellant received in a case on said frame and communicating with a chamber on said frame defined between a rear end surface of said piston and said base end of said cylinder and provided with means for ignition thereof upon detection of said deceleration level by said deceleration sensor; and
- cable means connected at one of its ends with said piston and at its other end with said seat belt pulling means for clamping and retracting said clamped seat for tightening said seat belt;
- said one end of said cable means being flared and being cast in said piston.

* * * * *